July 11, 1944.  C. C. AKIN  2,353,428
TIRE PRESSURE INDICATOR
Filed Jan. 2, 1942  3 Sheets-Sheet 1
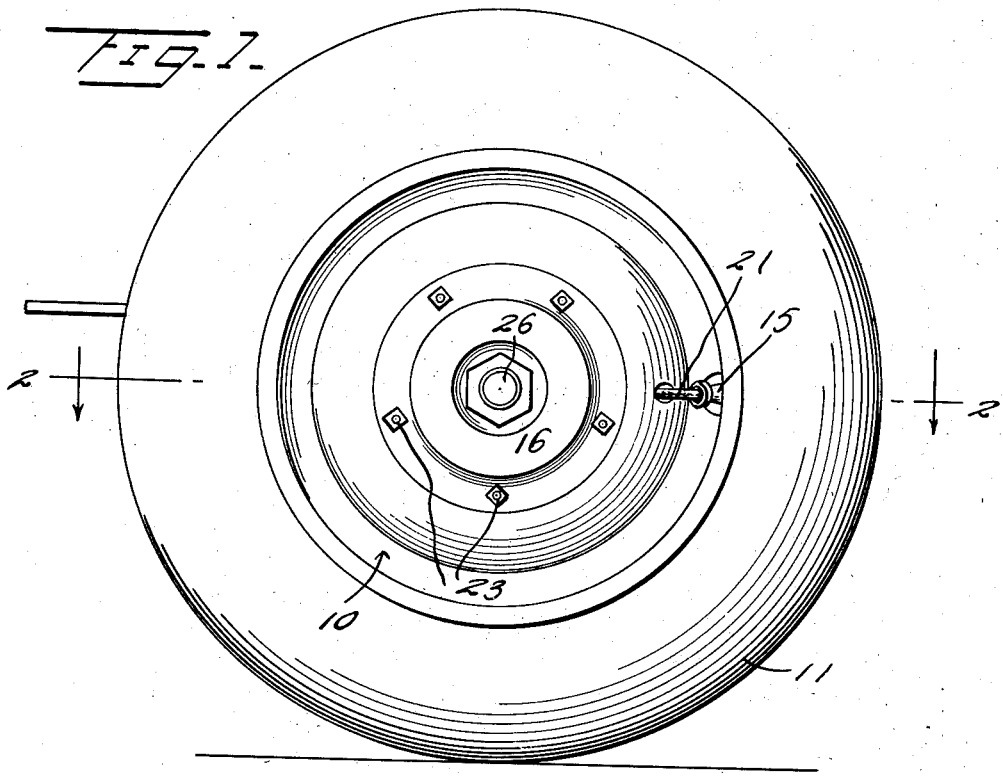
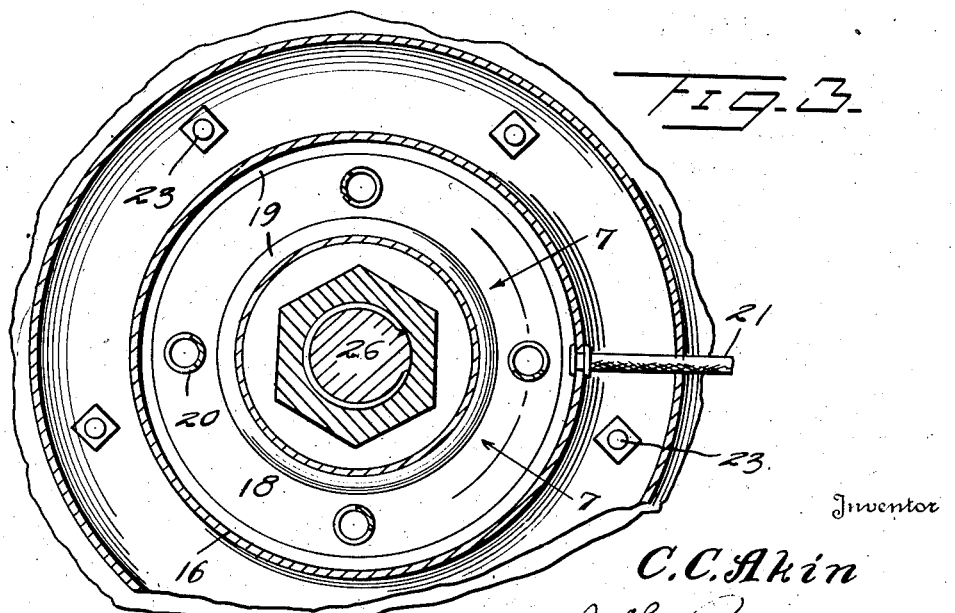
Inventor
C. C. Akin
By L. F. Randolph
Attorney

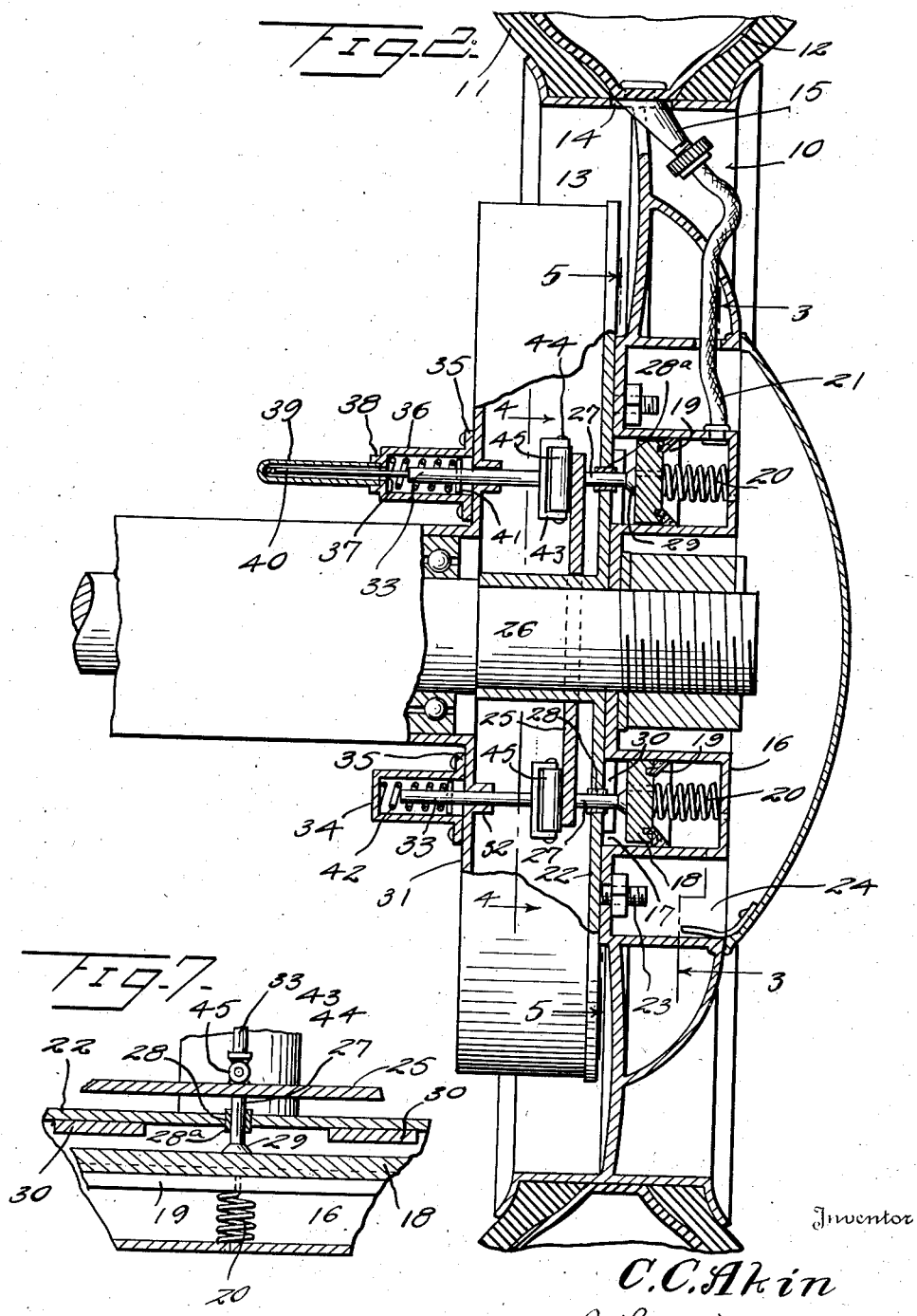

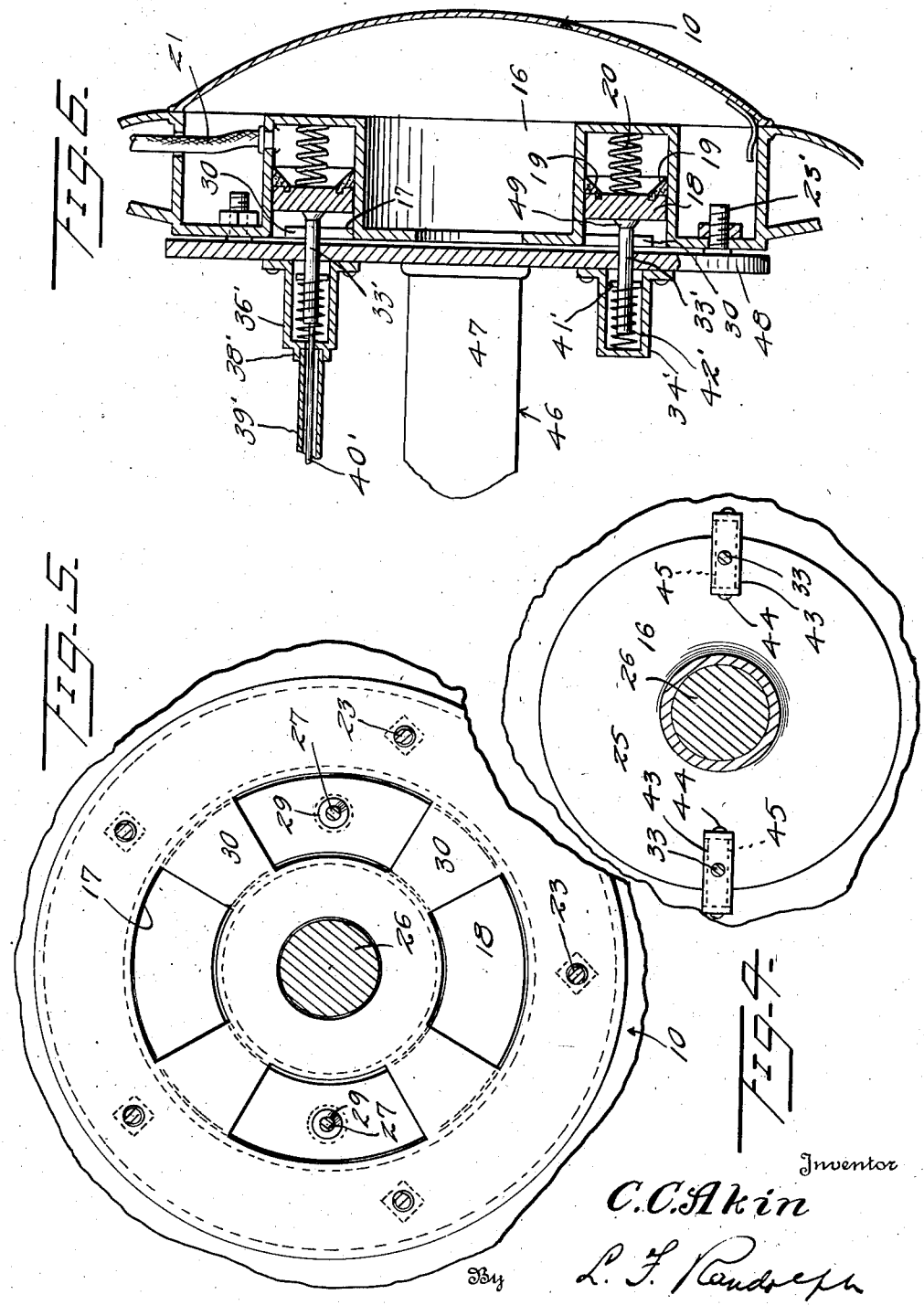

Patented July 11, 1944

2,353,428

UNITED STATES PATENT OFFICE 2,353,428

TIRE PRESSURE INDICATOR

Clarence C. Akin, Seminole, Okla., assignor to J. D. Akin, Seminole, Okla.

Application January 2, 1942, Serial No. 425,483

3 Claims. (Cl. 73—31)

This invention relates to a device adapted to be associated with the wheels, carrying pneumatic tires, of a vehicle for actuating pressure gages located on the dash or instrument board for indicating the air pressure in the tires of a motor vehicle, aeroplane or other carrier equipped with pneumatic tires.

More particularly, it is an aim of the invention to provide for actuating an indicator device, which can be readily mounted in a vehicle wheel and in the brake drum associated therewith, which will not interfere with removing or applying the wheel.

More particularly, it is an aim of the invention to provide a pressure indicating device including an annular chamber disposed within a vehicle wheel and in communication with the inflated inner tube thereof, and which is provided with a plunger adapted to be actuated by the air pressure in the tube and against the action of spring means, for actuating the air gage operator.

Still a further aim of the invention is to provide a rotatable ring having studs for engaging against the air pressure actuated plunger, and which is rotatable with the wheel and arranged to be engaged by a plurality of rollers mounted on spring pressed rods, which are adapted to be slidably mounted on the brake drum, and to one of which an air pressure gage operator is connected.

Still a further aim of the invention is to provide an air pressure indicating device for vehicle wheels which is adapted to function when the wheel is mounted as a spare.

Other objects and advantages of the invention will hereinafter become more fully apparent from the following description of the drawings, which illustrate a preferred embodiment thereof, and wherein—

Figure 1 is a side elevational view looking toward the outer side of a motor vehicle wheel provided with a pneumatic tire, Figure 2 is an enlarged horizontal sectional view taken substantially along the plane of the line 2—2 of Figure 1, Figures 3, 4 and 5 are sectional views of portions of the wheel and of the brake drum associated therewith, taken substantially along the planes indicated by the lines 3—3, 4—4 and 5—5, respectively, of Figure 2, Figure 6 is a fragmentary horizontal sectional view, partly in plan, showing the wheel mounted on a spare tire rack, and Figure 7 is a sectional view of a portion of the wheel taken substantially along the plane indicated by the line 7—7 of Figure 3.

Referring more particularly to the drawings, wherein like reference characters designate like or corresponding parts throughout the different views, 10 designates generally a wheel on which is mounted a pneumatic tire casing 11 containing an inner tube 12. The rim 13 of the wheel 10 is provided with an opening 14 through which a valve stem 15 extends. The valve stem 15 is of conventional construction and is adapted to contain a conventional valve, not shown.

The wheel 10 is provided around the hub thereof with an annular chamber 16 which opens at 17 through the inner side of the wheel and which contains an annular plunger 18 which is mounted to slide toward and away from the open inner side of the chamber 16 and the closed outer side thereof. The annular plunger 18 is provided with yieldable sealing members 19 which bear against the inner sides of the inner and outer annular walls of the chamber 16 to prevent leakage past the plunger 18, for a purpose which will hereinafter become apparent. A plurality of contracile coil springs 20 are each anchored at one end thereof to the outer closed side of the chamber 16 and are disposed therein and are connected at their opposite ends to circumferentially spaced portions of the plunger 18 for urging the plunger toward the closed end of the chamber 16. A flexible hose or conduit 21 has one end thereof opening into the annular chamber 16, between its closed end and the plunger 18. The opposite end of the conduit 21 is detachably connected to the valve stem 15 and is adapted to contain conventional means, not shown, for depressing the valve thereof to permit the air from the inner tube 12 to pass into the chamber 16 so that the pressure in the chamber equals the pressure in the inner tube. It will be readily obvious that the last mentioned end of the conduit 21 can be readily detached from the valve stem 15 to permit inflation of the inner tube 12. Furthermore, the conduit if applied, as seen in Figure 2, said conduit and the chamber 16 will combine to prevent deflation of the inner tube due to a leaky valve. The wheel 10 is detachably mounted on the front plate 22 of the brake drum, in a conventional manner, by means of threaded stud and nut fastenings 23 which are disposed in an annular chamber 24 of the wheel hub which is disposed on the outer side of the annular air chamber 16.

A ring 25 is rotatably mounted in the brake drum and around the axle 26 of the wheel 10. As seen in Figure 2, the ring 25 is relatively wide radially and is preferably provided with two studs 27 which extend from the outer side thereof through openings 28 in the front plate 22 of the brake drum. The studs 27 are provided with enlarged heads 29 at their free ends which are disposed to bear against the outer, exposed side of the annular plunger 18. As best seen in Figure 5, the inner, open side 17 of the chamber 16, is provided with a plurality of plates 30 which extend radially thereacross and which provide means for preventing the plunger 18 from being forced through the open side or end 17 of the chamber 16. The studs 27 extend into the chamber 16 between certain of the plates 30.

The back or dust guard plate 31, relative to which the wheel 10 and plate 22 are rotatably mounted, is provided with flanged openings 32 in each of which is slidably mounted a rod 33. The flanged openings 32 are preferably disposed in diametrically opposed relationship to one another and substantially in a horizontal plane relatively to one another. A housing 34 is provided with a flanged open end 35 which is secured by fastenings to the outer side of the plate 31 and in registry with one of the flanged openings 32 for receiving the outer end of one of the rods 33. The housing 36 is provided with a flanged open end 35 which is similarly attached to the outer side of the plate 31 to register with the other flanged opening 32 for receiving the outer end of the other rod 33. The housing 36 is provided with a restricted opening 37 in its opposite end and around which is disposed a nipple or annular flange 38 in which is secured one end of a flexible conduit 39. A flexible shaft 40 extends through the conduit 39 and has one end thereof extending through the opening 37 and fastened to the end of the rod 33 which is disposed in the housing 36. The opposite end of the flexible shaft 40 is adapted to be connected to a conventional air pressure gage, not shown, which may be of any suitable construction capable of being actuated by the reciprocating movement of the shaft 40, and which is adapted to be mounted on the dashboard or instrument board, not shown, of a vehicle on which the wheel 10 is mounted.

The ends of the rods 33 which are disposed in the housings 34 and 36 each have a pin 41 extending therethrough against which bears an expansion coil spring 42. The springs 42 are disposed in each of the housings 34 and 36 and said springs have their opposite ends bearing against the outer ends of said housings for urging the slidably mounted rods 33 inwardly of the brake drum and toward the ring 25. The rods 33 are provided with yoke shaped opposite ends 43 through which extend pins 44, on each of which is journaled an elongated roller 45. The rollers 45 are disposed radially of the ring 25 and are adapted to frictionally engage the opposite side thereof and to roll thereon when the wheel 10 is rotating.

From the foregoing it will be obvious that the pressure of the air in each inner tube 12 of each of the wheels of a motor vehicle, not shown, will equal the pressure of the air in the annular chamber 16, of the wheel 10 on which said inner tube 12 is mounted. This pressure will project the plunger 18 of the said chamber 16 against the action of the contractile springs 20 thereof for retracting the rods 33. The rod 33 which is connected to the gage actuating member 40 will project said member, when said rod is retracted. As the pressure in the inner tube 12 diminishes the pressure in the chamber 16, connected thereto, will likewise diminish allowing the springs 20 to retract the plunger 18 thus permitting the springs 42 to project the rods 33 so that the rod 33, which is connected to the member 40, will operate to retract said member 40. It will thus be readily apparent that when each wheel of a vehicle is provided with a pressure responsive device, as shown in Figure 2, and when each of the members 40 is connected to a suitable gage, mounted on the dashboard of the vehicle, not shown the operator of the vehicle can ascertain at a glance the pressure in the tires of each of the wheels. The rod 33, which is not connected to the member 40, and the parts associated therewith are provided so that an equal pressure or force will be exerted against the diametrically opposed points of the ring 25 to hold the ring substantially parallel to the plane of the wheel 10. The pressure exerted by the springs 42 is only sufficient to retain the rollers 45 in engagement with the ring 25 and the studs 27 in engagement with plunger 18 as springs 20 resist the air pressure in chamber 16. Openings 28 are provided with bushings 28a for slidably engaging studs 27 to prevent any rocking movement of the studs so that ring 25 will be supported thereby substantially parallel to the plate 22 and out of engagement with the axle. Studs 27 can be secured to the ring 25 as by welding or by a threaded connection which will not mar the side of the ring, engaged by rollers 45, and the head 29 may be omitted or be formed after studs 27 are in engagement with bushings 28a. The rollers 45 will roll on the ring 25 so as to hold the headed ends 29 of the studs 27 against the exposed side of the plunger 18 to cause the ring 25 to move toward the plate 22 when the air pressure in the closed side of the chamber 16 diminishes.

It will be readily apparent that the wheel 10 can be mounted or demounted in a conventional manner.

Referring to Figure 6, 46 designates generally a spare tire support including a supporting arm 47 and a plate or bracket 48 having studs 23' by which the wheel 10 can be detachably mounted on the support 46. The plate 48 has diametrically opposed openings in which rods 33' are slidably mounted. The outer end of one of the rods 33' is mounted in the housing 34', corresponding to the housing 34, and the outer end of the other rod 33' is mounted in the housing 36', corresponding to the housing 36. The housings 34' and 36' are attached to the back side of the plate 48 and contain expansion coil springs 42' which bear against pins 41', which extend through the rods 33' for urging said rods outwardly of the housings 34' and 36'. A flexible conduit 39' is connected at one end to the flanged end 38' of the housing 36' and contains a flexible shaft 40' which is connected at one end thereof to the rod 33' of the housing 36', and which is connected at its opposite end to an air pressure gage on the dashboard of the vehicle. As there is no movement of the wheel 10 on the support 46, the ring 25 and rollers 45 can be dispensed with. The outer ends of the rods 33' are therefore preferably provided with heads 49 which extend into the open side 17 of the chamber 16 and which bear against the exposed side of the plunger 18. It will thus be readily apparent that the device is readily adapted for use for indicating the air pressure in a spare tire as well as the tires of the wheels which are in use.

Various modifications and changes are contemplated and may obviously be resorted to, provided they fall within the spirit and scope of the invention as hereinafter defined by the appended claims, as only a preferred embodiment of the invention has been disclosed.

I claim as my invention:

1. A tire pressure indicator comprising a vehicle wheel, a pneumatic tire thereon, an annular chamber mounted on said vehicle wheel and opening inwardly thereof, conduit means connected to the chamber and to the pneumatic tire and forming a passage between the chamber and the tire, an annular plunger slidably mounted in said chamber and adapted to be moved inwardly of the wheel by the air pressure in the chamber, means for yieldably urging the plunger in the opposite direction, a brake drum on the wheel having front and back plates, a ring concentric with the rotatable axis of the wheel mounted in said brake drum, from which the wheel is detachable, means extending from said ring at a plurality of points through said front plate for sliding movement with the plunger, spring pressed rods slidably mounted in said back plate urged toward said ring, and said rods having portions engaging the ring, and a gage-actuating element connected to and actuated by one of said rods.

2. An air pressure indicating device as in claim 1, comprising a plurality of circumferentially spaced stop members disposed at the inner, open end of said annular chamber for restricting the movement of the plunger toward the open end of the chamber.

3. A tire-pressure indicator comprising in combination with a vehicle wheel and a pneumatic tire thereon, an annular chamber mounted on said wheel, concentric with the rotatable axis thereof, a conduit for connecting said chamber to the pneumatic tire, a plunger slidably mounted in said chamber adapted to be moved in one direction by the air pressure therein, spring means for moving said plunger in the opposite direction, a brake drum on said wheel having front and back plates, a ring concentric with the rotatable axis of the wheel disposed in the brake drum, means extending from said ring through said front plate and engaging said plunger for sliding the ring toward and away from the inner side of the wheel following the movements of the plunger, a spring pressed rod slidably mounted in the back plate of the brake drum, said rod having one end engaging the ring and a gauge actuating element connected to the opposite end of the rod for actuation thereby.

CLARENCE C. AKIN.